(12) United States Patent
Fujino

(10) Patent No.: US 7,006,251 B2
(45) Date of Patent: Feb. 28, 2006

(54) PRINT CONTROL APPARATUS HAVING SATURATION ENHANCING FUNCTION AND CORRESPONDING PRINT CONTROL METHOD

(75) Inventor: Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 09/977,063

(22) Filed: Oct. 11, 2001

(65) Prior Publication Data

US 2003/0072015 A1 Apr. 17, 2003

(51) Int. Cl.
G06F 15/00 (2006.01)

(52) U.S. Cl. .................. 358/1.9; 358/518; 358/520; 358/504; 358/515; 347/14; 347/16; 347/19; 355/246

(58) Field of Classification Search ............... 355/246; 347/19, 16, 14; 358/515, 504, 520, 518, 358/1.9
See application file for complete search history.

(56) References Cited

U.S. PATENT DOCUMENTS

| | | | | |
|---|---|---|---|---|
| 5,517,335 A | * | 5/1996 | Shu ........................... 358/518 |
| 5,615,312 A | * | 3/1997 | Kohler ........................ 358/1.9 |
| 5,734,745 A | | 3/1998 | Ohneda | |
| 6,154,227 A | * | 11/2000 | Lund ............................ 347/14 |
| 6,731,398 B1 | * | 5/2004 | Yoshizawa ................... 358/1.2 |
| 2003/0043394 A1 | * | 3/2003 | Kuwata et al. .............. 358/1.9 |
| 2004/0095432 A1 | * | 5/2004 | Kakutani ...................... 347/43 |
| 2004/0184057 A1 | * | 9/2004 | Nakabayshi et al. ......... 358/1.9 |
| 2004/0239722 A1 | * | 12/2004 | Otsuki ......................... 347/40 |
| 2004/0252345 A1 | * | 12/2004 | Uekusa et al. .............. 358/2.1 |

\* cited by examiner

Primary Examiner—Kimberly Williams
Assistant Examiner—Michael Burleson
(74) Attorney, Agent, or Firm—Beyer Weaver & Thomas, LLP

(57) ABSTRACT

A preset range of hues, for which saturation (chroma) is to be enhanced, is stored in advance in a printer driver. The printer driver receives an input of color image data, enhances saturation (chroma) of the input color image data with regard to the preset range of hues, determines creation or non-creation of ink dots of multiple colors based on the image data of the enhanced saturation (chroma), and outputs the results of determination to a color printer. A resulting color image with enhanced saturation (chroma) with regard to the preset range of hues is then printed with the color printer. The arrangement of storing the preset range of hues, which are expressible with the color printer but can not attain so high saturation (chroma) as that of silver halide photographs enables images of high saturation (chroma) like the silver halide photographs to be printed.

18 Claims, 11 Drawing Sheets

Fig.6
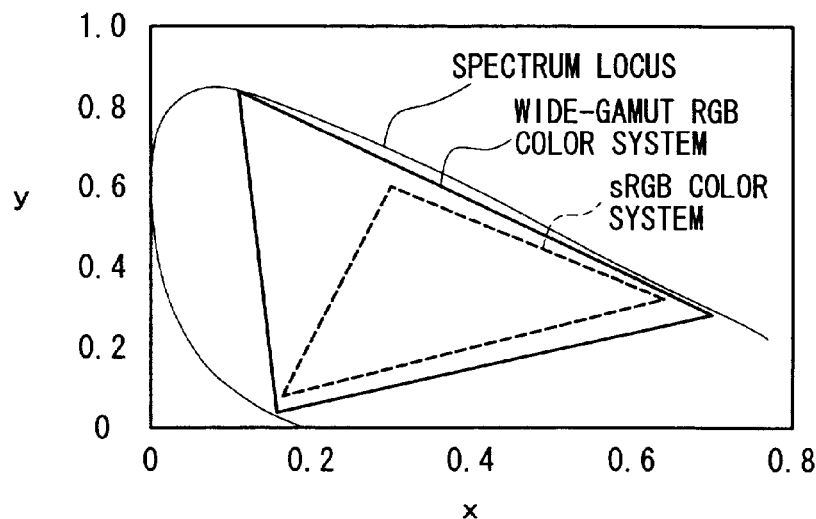
Fig.7(a)
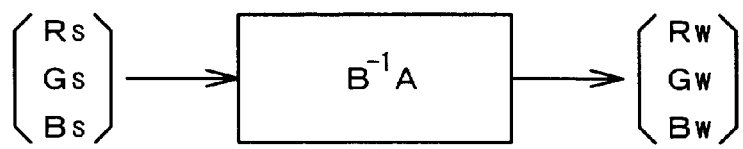
Fig.7(b)
$$\begin{pmatrix} Rs \\ Gs \\ Bs \end{pmatrix} \rightarrow A = \begin{pmatrix} 0.436 & 0.385 & 0.143 \\ 0.222 & 0.717 & 0.061 \\ 0.014 & 0.097 & 0.714 \end{pmatrix} \rightarrow \begin{pmatrix} X \\ Y \\ Z \end{pmatrix}$$
Fig.7(c)
$$\begin{pmatrix} Rw \\ Gw \\ Bw \end{pmatrix} \rightarrow B = \begin{pmatrix} 0.717 & 0.101 & 0.147 \\ 0.259 & 0.725 & 0.017 \\ 0 & 0.051 & 0.774 \end{pmatrix} \rightarrow \begin{pmatrix} X \\ Y \\ Z \end{pmatrix}$$

| ENHANCEMENT LEVEL COEFFICIENT KL | SETTING |
|---|---|
| KL0 | 0 |
| KL1 | 1 |
| KL2 | 1.5 |

PRINT CONTROL APPARATUS HAVING SATURATION ENHANCING FUNCTION AND CORRESPONDING PRINT CONTROL METHOD

BACKGROUND OF THE INVENTION

1. Field of the Invention

The present invention relates to a technique of creating ink dots of respective colors on a printing medium, so as to print a high-quality color image.

2. Description of the Related Art

Diverse imaging apparatuses that deal with color images, such as digital cameras, color scanners, color monitors, and color printers, have been used widely. Any of such imaging apparatuses treats each color image as a composition of three image components, R, G, and B image components corresponding to three primary colors of light. The shooting apparatuses like digital cameras and color scanners output RGB tone levels corresponding to the R, G, and B images as color image data. Based on the output RGB tone levels, for example, the color monitor forms the respective R, G, and B images and combines these three images on the screen to display a color image. The color printer converts the RGB tone levels of the input image data into tone levels of cyan (C), magenta (M), and yellow (Y) processible in the printer and makes dyes of cyan, magenta, and yellow applied on the printing medium by any of various techniques according to the converted CMY tone levels, so as to print a color image.

RGB image data output from the shooting apparatuses like digital cameras and color scanners may depend upon the model of the shooting apparatus. This is because different models have different sensitivities of a detector that separates the color image into three color components corresponding to three primary colors of light, that is, the R image component, the G image component, and the B image component. The color expressed on the monitor or the printing medium in response to input of identical RGB image data may be varied subtly according to the type of the color monitor or the color printer. In the case of the color monitor, different models may have subtly different sensitivities of the respective R, G, and B images displayed on the screen based on the RGB image data. In the case of the color printer, different models may have subtle differences in development of the respective colors, cyan, magenta, and yellow. In order to attain expression of the original colors with the color monitor or the color printer, it is required to make the characteristics of the output side of the RGB image data like the digital camera and the color scanner coincident with the characteristics of the input side of the RGB image data like the color monitor and the color printer.

It is undesirably time- and labor-consuming to adjust the characteristics of the output side of RGB image data and the characteristics of the input side of RGB image data every when the combination of these imaging apparatuses is changed. The following technique has thus been adopted widely. The technique assumes a virtual reference detector having a predetermined sensitivity and specifies RGB image data output from this virtual detector as standard r. sRGB image data is typically used as the standard image data. The shooting apparatuses like digital cameras and color scanners convert the RGB image data into the standard image data (sRGB image data) and output the converted standard image data. The characteristics of the color monitor and the color printer are adjusted to enable accurate reproduction of colors of the standard RGB image data (sRGB image data). This procedure ensures accurate reproduction of original colors, irrespective of the characteristics of the shooting apparatus that outputs image data and irrespective of the characteristics of the apparatus that receives the processed image data.

The prior art method, however, does not ensure the satisfactory picture quality even when the color printer accurately reproduces the standard RGB image data. The recent advancement has improved the printing quality of the color printer and enables images of high picture quality comparable to the quality of silver halide photographs to be printed. The vividness of the images printed with the color printer is, however, not so high as that of the silver halide photographs. This leads to unsatisfactory picture quality of the printed images.

SUMMARY OF THE INVENTION

The object of the present invention is thus to solve the above problems and to provide a technique that receives standard RGB image data and prints images of the higher picture quality.

At least part of the above and the other related objects is attained by a print control apparatus that controls a printing unit, which applies multiple color inks on a printing medium to print a color image. The print control apparatus includes: an image data input module that receives an input of color image data; a hue storage module that stores in advance a predetermined range of hues for which saturation (chroma) is to be enhanced; a saturation (chroma) enhancement module that enhances saturation of the input color image data in the predetermined range of hues; an ink application density specification module that specifies an application density of ink to be applied on the printing medium with regard to each of the multiple color inks, based on the color image data with the enhanced saturation (chroma) in the predetermined range of hues; and a control signal output module that outputs the specified application density of each color ink as a control signal to the printing unit.

There is a print control method corresponding to the print control apparatus discussed above. The present invention is thus directed to a print control method of controlling a printing unit, which applies multiple color inks on a printing medium to print a color image. The print control method includes the steps of: storing a predetermined range of hues for which saturation (chroma) is to be enhanced; receiving an input of color image data and enhancing saturation (chroma) of the color image data in the predetermined range of hues; specifying an application density of ink to be applied on the printing medium with regard to each of the multiple color inks, based on the color image data with the enhanced saturation (chroma) in the predetermined range of hues; and outputting the specified application density of each color ink as a control signal to the printing unit.

In the print control apparatus and the corresponding print control method of the present invention, the predetermined range of hues for which saturation (chroma) is to be enhanced is stored in advance. The process enhances saturation (chroma) of the color image data in the predetermined range of hues and specifies an application density of each of the multiple color inks based on the image data with the enhanced saturation (chroma). The application density of each color ink thus specified is supplied to the printing unit as the control signal for controlling the ink application density of each of the multiple color inks.

The technique of the present invention attained as the print control apparatus or the corresponding print control method discussed above has been completed, based on the finding that the range of colors or the color gamut expressible on the color positive film, the color gamut expressible by the printing apparatus that makes inks applied on a printing medium to print a color image (hereinafter referred to as the color printer), and the color gamut in the sRGB color space used as the standard format of RGB image data hold the following relation. The newly found relation is described first to clarify the functions and effects of the present invention. In the explanation below, the RGB image data expressed in the sRGB color space is referred to as the image data in the sRGB color system. A diversity of techniques may be adopted to make inks applied on a printing medium to print a color image. Some examples include the ink jet technique that ejects ink droplets to create ink dots and thereby makes ink applied on the printing medium, the thermal transfer technique that causes ink fused by application of heat to be transferred to the printing medium, and the dye sublimation technique that sublimates ink and makes the sublimated ink applied on the printing medium. The following discussion regards the ink jet technique adopted as the method of ink application.

FIG. 16 shows the relationship among the color gamut of the color positive film, the color gamut of the color printer, and the color gamut of the sRGB color system. The symbol 'x' in FIG. 16 represents the results of colorimetry of colors expressed on the color positive film plotted in an xy chromaticity diagram. Parts of various colors have been selected among multiple photographs and subjected to colorimetry, in order to allow expression of the color gamut of the color positive film as accurately as possible. The symbol 'o' in FIG. 16 represents the results of colorimetry of the color gamut in the color printer plotted in the xy chromaticity diagram. Patch images, which respectively present the colors in the whole range expressible with the printer are printed. The colors of the patch images are measured for colorimetry of the color gamut in the color printer. The solid curve is the locus obtained by plotting the colors of light in the xy chromaticity diagram with a variation in wavelength of light. The locus shows the restriction of expressible colors and is called the spectrum locus. The distance closer to the spectrum locus in the xy chromaticity diagram represents the higher saturation (chroma) of colors. The indications 'red', 'green', and 'blue' in the vicinity of the spectrum locus shown in FIG. 16 mean that the respective peripheral areas correspond to the hues of red, green, and blue.

The results of colorimetry shown in FIG. 16 show that the color gamut of the recent color printer is practically equivalent to the color gamut of the color positive film. As shown by the broken line in FIG. 16, the overlapped display of the color gamut in the sRGB color system in the xy chromaticity coordinates shows that the color gamut in the sRGB color system has a narrower part than the color gamut of the color printer and the color gamut of the color positive film. Especially in the high-saturation hue range of green to blue, the color gamut in the sRGB color system is narrower. The results of colorimetry shown in FIG. 16 regard the ink jet color printer that ejects ink droplets and thereby creates ink dots on a printing medium. The above phenomenon, however, does not depend upon the method of creating ink dots on the printing medium, but commonly arises in diverse color printers.

The inventors of the present invention have found the reason why accurate reproduction of color image data with a color printer does not ensure the high picture quality of the resulting printed image equivalent to the picture quality of the color positive film, and have completed the present invention. The sRGB color system widely used as the general data format of color image data can not deal with high-saturation (chroma) colors in the hue range of green to blue. Although the color printer is capable of expressing such colors, reproduction of the image data in the sRGB color system does not lead to printing the high-saturation (chroma) green and blue. This is why even accurate reproduction of image data with the color printer does not ensure the sufficiently high picture quality of the resulting printed image.

The color printer may receive image data expressed in the L*a*b* color system that does not have restriction in the direction of saturation (chroma) unlike the sRGB color system. The similar phenomenon is observed in this case. The sRGB color system is widely used as the standard data format of color image data, so that the image data in the L*a*b* color system is thus often converted from the image data first expressed in the sRGB color system. Expression of image data in the sRGB color system having the narrow color gamut loses data of green and blue having high saturation (chroma). Subsequent conversion of the image data into the L*a*b* color system does not recover the lost data. In such cases, even when the color printer receives the image data expressed in the L*a*b* color system, accurate reproduction of the image data may not ensure sufficient picture quality of the resulting printed images. This problem is not restricted to the color image data expressed in the sRGB color system but arises in color image data expressed in any color system having a narrow color gamut and any converted color image data of a narrow color gamut.

In the print control apparatus and the corresponding print control method of the present invention, the arrangement stores in advance the predetermined range of hues for which saturation (chroma) is to be enhanced, enhances saturation (chroma) of the input color image data in the predetermined range of hues, and specifies the application density of each color ink based on the saturation (chroma)-enhanced image data. A concrete procedure stores hues in a specific color gamut that is printable with the color printer but is not expressible by the color image data, for example, colors of green to blue having high saturation (chroma), and enhances saturation (chroma) of the image data with regard to the stored hues. This effectively restores the image data of lost high saturation (chroma) Accurate reproduction of the colors of the restored image data with the color printer gives a printed image of sufficiently high picture quality.

In the print control apparatus of the present invention, one preferable application stores hues from blue to green as the predetermined range of hues for which saturation (chroma) is to be enhanced and enhances saturation (chroma) of image data of the hues in this range.

As shown in FIG. 16, the color printer can express colors of higher saturation (chroma) than the color gamut of the image data in the hue range of blue to green. The arrangement of storing this hue range as the predetermined range of hues for which saturation (chroma) is to be enhanced enables high-quality images to be printed.

In the print control apparatus of the present invention, another preferable application converts the input color image data into data of another expression format using saturation (chroma), hue, and lightness, and enhances saturation (chroma) of the color image data converted in another expression format with regard to the predetermined range of hues.

The conversion of color image data into the expression format using saturation (chroma), hue, and lightness desirably facilitates enhancement of saturation (chroma) only in the specific hue.

In one preferable application of the print control apparatus, the saturation (chroma) is enhanced by a greater degree with an increase in saturation (chroma) of the color image data in the predetermined range of hues. In the case where color image data including colors of high saturation (chroma) is converted into color image data of the narrow color gamut, the conversion may lower the saturation (chroma) by a greater rate for data of the higher saturation (chroma). In such cases, enhancement of image data having high saturation (chroma) by a greater degree desirably gives a printed image sufficiently close to the original image prior to conversion into the color image data of the narrow color gamut.

In the print control apparatus and the corresponding print control method of the present invention, one preferable procedure converts input color image data into wide gamut color image data in a specific data format that is capable of expressing colors of higher saturation (chroma) and subsequently enhances saturation (chroma) of the converted wide gamut color image data in the predetermined range of hues.

The arrangement of enhancing the saturation (chroma) after conversion into the wide gamut color image data desirably allows processing of image data with high saturation (chroma), which is not processible in the color image data before conversion.

In the print control apparatus of the present invention, a preferable application stores in advance a plurality of different degrees of enhancement for saturation (chroma) of the color image data and enhances the saturation (chroma) of the color image data according to one enhancement degree selected among the plurality of different enhancement degrees thus stored.

This arrangement enables an adequate enhancement degree to be selected among the plurality of different enhancement degrees according to an image to be printed, thus ensuring printed images of desirable printing quality.

In the print control apparatus of the present invention, the following process may be adopted to prohibit enhancement of saturation (chroma) of color image data. The process sets in advance execution or non-execution of enhancement for the saturation (chroma) of the color image data. The process prohibits the saturation (chroma) enhancement module from enhancing the saturation (chroma) and supplies the color image data received by the image data input module to the ink application density specification module, when the setting represents non-execution of enhancement for the saturation (chroma) of the color image data. The ink application density specification module specifies the application density of each of the multiple color inks, based on the supplied color image data.

Some of color image data may include only colors of relatively low saturation (chroma), which is sufficiently treatable by the color image data of the narrow color gamut or only colors of comparatively higher saturation (chroma), which is still treatable by the color image data of the narrow color gamut. Enhancement of saturation (chroma) of such color image data may give unnatural printed images. The print control apparatus of this application prohibits enhancement of saturation (chroma) according to the requirements, thus ensuring natural printed images.

In the print control apparatus using a conversion table that represents a mapping of input color image data to converted image data, the following process may be adopted to convert the image data into a control signal and output the control signal. The conversion table stored in advance represents a mapping of input color image data to image data with enhanced saturation (chroma) in a predetermined range of hues. The process receives an input of color image data, and refers to the conversion table to change the input color image data into the converted image data. The process then specifies an application density of each of the multiple color inks based on the converted image data, and outputs the specified application density of each color ink as the control signal to the printing unit.

The process of referring to the conversion table changes the input color image data into the converted image data, thus ensuring quick output of the control signal.

In the print control apparatus of this application, the conversion table may store a mapping of color image data in a first color system to color image data in a second color system.

The process of referring to such a conversion table converts the image data in the first color system into the image data in the second color system, simultaneously with enhancing the saturation (chroma) in the predetermined range of hues. This arrangement ensures quick output of the control signal even when the input image data should be output as the control signal in a different color system, for example, when the image data in one RGB color system should be output as the control signal of the image data in another CMY color system.

The print control apparatus discussed above may be combined with the printing unit that makes multiple color inks applied on a printing medium to print an image to give a printing apparatus. Such a printing apparatus desirably prints high-quality color images with enhanced saturation (chroma) in a predetermined range of hues.

The technique of the present invention may be attained by a computer, in which a program for actualizing the functions of the print control apparatus is incorporated.

The present invention is thus directed to a computer program product that actualizes a print control method of controlling a printing unit, which applies multiple color inks on a printing medium to print a color image. The computer program product includes: a recording medium in which data is recorded in a computer readable manner; and a computer program recorded in the recording medium. The computer program includes the program codes of: storing a predetermined range of hues for which saturation (chroma) of a color image is to be enhanced; receiving an input of color image data and converting the input color image data, so as to enhance saturation (chroma) of the color image data in the predetermined range of hues; specifying an application density of ink to be applied on the printing medium with regard to each of the multiple color inks, based on the color image data with the enhanced saturation (chroma) in the predetermined range of hues; and outputting the specified application density of each color ink as a control signal to the printing unit.

The computer executes the program codes recorded in the computer program product to enhance saturation (chroma) in the predetermined range of hues and thereby print images of high picture quality.

BRIEF DESCRIPTION OF THE DRAWINGS

FIG. 6 is an xy chromaticity diagram showing comparison between the color gamut in the sRGB color system and the color gamut in the wide gamut RGB color system.

FIG. 7 conceptually shows linear mapping to convert image data in the sRGB color system into image data in the wide gamut RGB color system.

DESCRIPTION OF THE PREFERRED EMBODIMENTS

Figure 1:
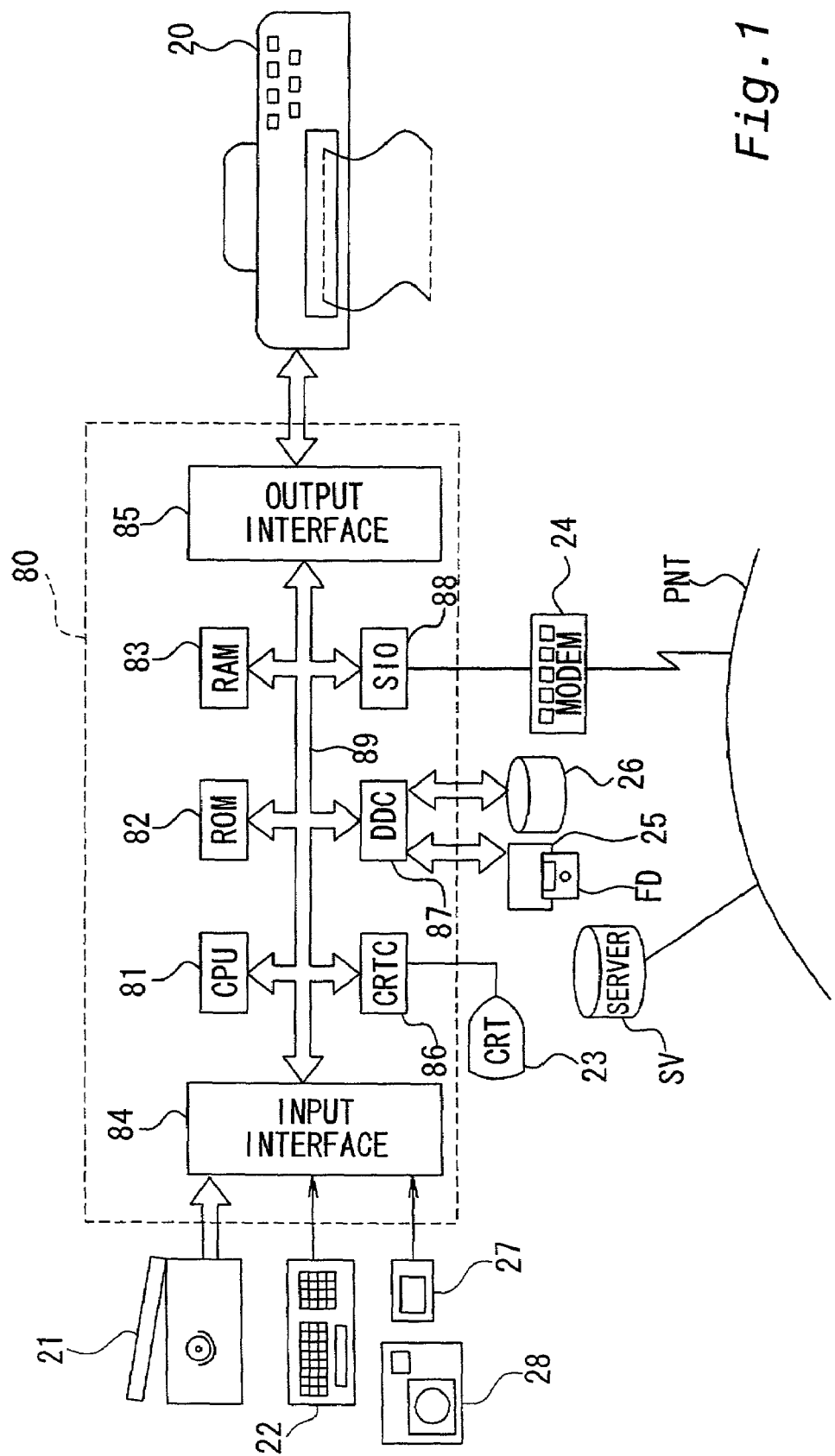
FIG. 1 schematically illustrates the construction of a printing system in one embodiment of the present invention.

In order to further clarify the functions and effects of the present invention, some modes of carrying out the present invention are discussed below in the following sequence:

A. First Embodiment
  A-1. Construction of Apparatus
  A-2. Process of Enhancing Saturation B. Second Embodiment
  B-1. Process of Enhancing Saturation
  B-2. Modification A. First Embodiment A-1. Construction of Apparatus FIG. 1 illustrates the construction of a printing system including a print control apparatus and a printing apparatus in one embodiment of the present invention. As illustrated, the printing system includes a computer 80 connecting with a color printer 20. The computer 80 loads and executes a predetermined program and functions, in cooperation with the color printers, as an integral printing system. Color originals to be printed are, for example, images generated by various application programs 91 on the computer 80. Other examples include color images read by a scanner 21 connecting with the computer 80 and images shot with a digital camera (DSC) 28 and transmitted via a memory card 27. Master data ORG of these images are converted to image data printable with the color printer 20 by a CPU 81 included in the computer 80 and are output as final image data FNL to the color printer 20. The color printer 20 controls creation of ink dots of respective colors on a printing medium according to the image data FNL, thereby printing a color image corresponding to the color original on the printing medium.

The computer 80 includes the CPU 81 that executes diverse operations, a RAM 83 that temporarily registers data therein, a ROM 82 that stores various programs therein, and a hard disk 26. Connection of an SIO 88 to a public telephone line PNT via a model 24 enables required data and programs to be downloaded from a server SV on an external network into the hard disk 26.

The color printer 20 is capable of printing color images. In this embodiment, an ink jet printer that creates dots of four color inks, cyan (C), magenta (M), yellow (Y), and black (K), on printing paper is applied for the color printer 20. The ink jet printer may further create dots of light cyan ink and light magenta ink in addition to these color inks. In the following description, cyan ink, magenta ink, yellow ink, and black ink may be referred to as C ink, M ink, Y ink, and K ink, respectively.

The color printer 20 utilizes piezoelectric elements for ejection of ink to create ink dots on printing paper. Although the color printer 20 used in this embodiment adopts the technique of utilizing piezoelectric elements for ejection of ink, the printer used may have a nozzle unit that ejects ink by another technique. For example, one available printer supplies power to a heater disposed in each ink conduit and ejects ink by means of bubbles produced in the ink conduit. Another available printer utilizes a phenomenon like thermal transfer to create ink dots on printing paper, instead of ejecting ink.

Figure 2:
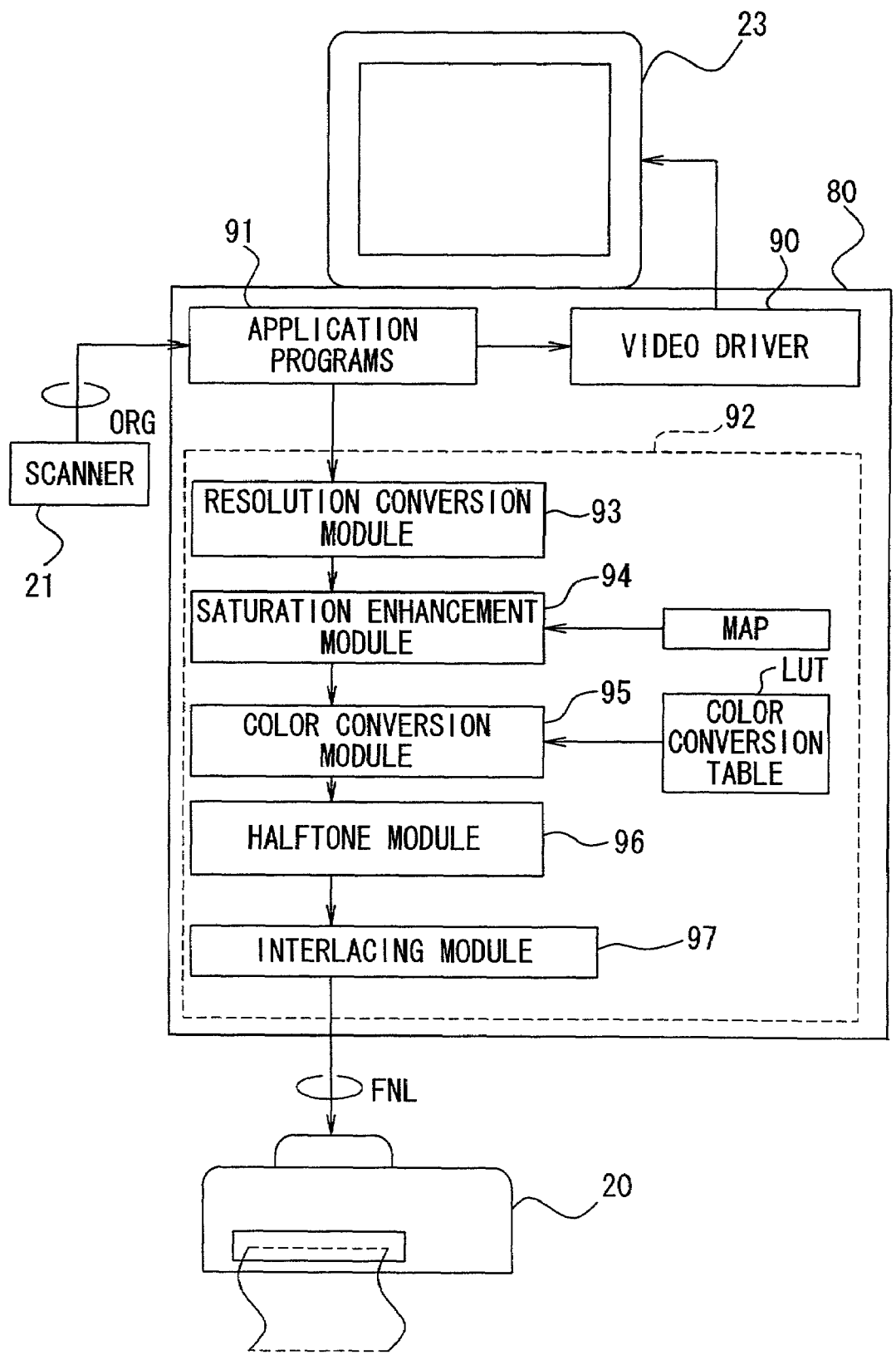
FIG. 2 illustrates the software configuration.

FIG. 2 is a block diagram conceptually showing the software configuration in the computer 80 to attain functions of the print control apparatus in this embodiment. In the computer 80, all the application programs 91 work under management of an operating system. A video driver 90 and a printer driver 92 are incorporated into the operating system. Image data output from the respective application programs 91 are transmitted to the color printer 20 via these drivers.

In response to a print command output from the application program 91, the printer driver 92 in the computer 80 receives image data from the application program 91, carries out a predetermined series of image processing to convert the input image data into the final image data FNL printable with the printer 20, and outputs the converted image data FNL to the color printer 20.

As conceptually shown in FIG. 2, the series of image processing executed by the printer driver 92 mainly consists of five modules, that is, a resolution conversion module 93, a saturation enhancement module 94, a color conversion module 95, a halftone module 96, and an interlacing module 97. The following briefly describes the contents of the image processing carried out by the respective modules.

The resolution conversion module 93 converts the resolution of image data received from any of the diverse application programs 91 into a printing resolution that enables printing with the color printer 20. When the resolution of the input image data is lower than the printing resolution, the process carries out linear interpolation to generate new supplement data between existing adjacent image data, so as to convert the resolution of the image data into the printing resolution. When the resolution of the input image data is higher than the printing resolution, on the contrary, the process skips the existing image data at a preset rate, so as to convert the resolution of the image data into the printing resolution.

The saturation enhancement module 94 receives the image data of the converted printing resolution from the resolution conversion module 93 and enhances saturation (chroma) of pre-stored hues in the input image data. The details of the processing will be discussed later. Information regarding the hues for which saturation (chroma) is to be enhanced and the degree of enhancement is stored in advance, for example, in the form of a map, in the printer driver 92. The saturation enhancement process is carried out by referring to such information. This enables a resulting printed image to have high quality and faithfully reproduce the genuine colors of the original color image.

The color conversion module 95 receives the image data of the enhanced saturation (chroma) from the saturation enhancement module 94 and carries out color conversion. The color conversion process converts image data defined by tone levels in one combination of colors R, G, and B into image data defined by tone levels in another combination of colors C, M, Y, and K used in the color printer 20. The process utilizes a color conversion table LUT, in which each color expressed by the combination of tone levels of R, G, and B is mapped to a combination of tone levels of C, M, Y, and K.

In the LUT of this embodiment, each RGB image data of the enhanced saturation (chroma) is mapped to a combination of tone levels of C, M, Y, and K. Selection of one RGB image data before enhancement of saturation (chroma) automatically specifies one RGB image data of the enhanced saturation (chroma). The LUT may thus represent a mapping of each RGB image data before enhancement of saturation (chroma) to a combination of tone levels of C, M, Y, and K that expresses corresponding RGB image data of the enhanced saturation (chroma). The application of using the LUT representing the latter mapping integrates the saturation enhancement module 94 with the color conversion module 95 to implement color conversion simultaneously with enhancement of saturation (chroma). This application ensures high-speed image processing, thus enabling a resulting image to be printed within a shorter time period.

The halftone module 96 receives the color converted image data from the color conversion module 95 and carries out halftoning. In this embodiment, the color converted image data is expressed in a range of 256 tones with regard to each color. The color printer 20 of the embodiment, however, attains only two states 'creation of dot' and 'creation of no dot'. Namely the color printer 20 of the embodiment locally allows expression of only two tones. It is accordingly required to convert the image data having 256 tones into image data of 2 tone levels expressible with the color printer 20. The halftoning process reduces the number of tones and thereby converts the image data received from the color conversion module 95 into dot data representing the dot on-off state.

The interlacing module 97 receives the dot data with regard to respective color ink dots from the halftone module 96 and carries out an interlacing process. The interlacing process rearranges the converted image data into the format representing the dot on-off state in a sequence to be transferred to the color printer 20 by taking into account the order of dot creation. The interlace module 97 outputs the resulting rearranged data as the final image data FNL to the color printer 20.

The color printer 20 creates ink dots of respective colors according to the final image data FNL, so that an image corresponding to the master image data ORG is printed on printing paper.

Figure 3:
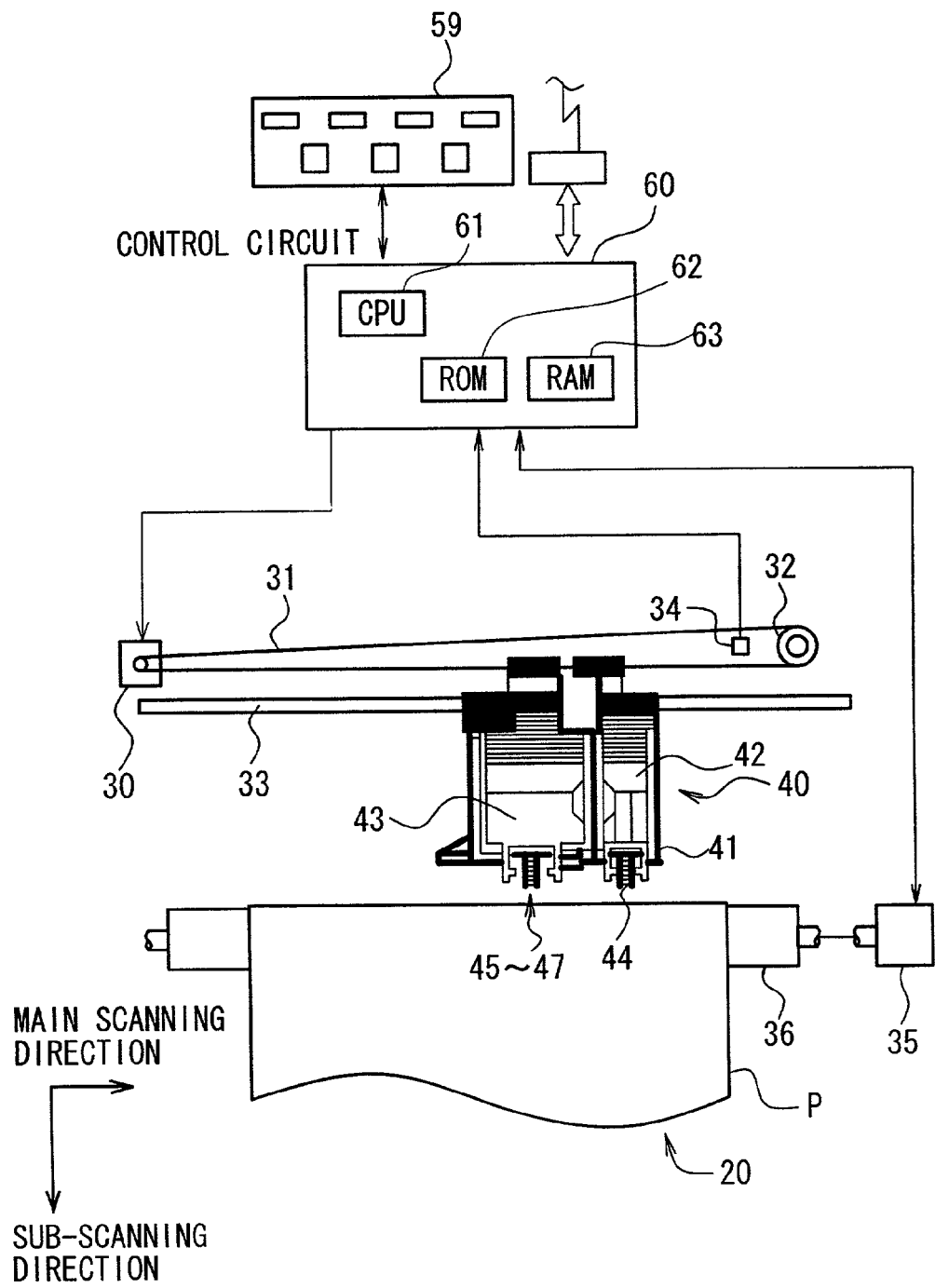
FIG. 3 schematically illustrates the structure of a color printer in the embodiment.

FIG. 3 schematically illustrates the structure of the color printer 20 in this embodiment. The color printer 20 includes a mechanism of driving a print head 41 mounted on a carriage 40 for ink ejection and dot creation, a mechanism of driving a carriage motor 30 to move the carriage 40 back and forth along an axis of a platen 36, a mechanism of driving a sheet feed motor 35 to feed printing paper P, and a control circuit 60.

The mechanism of reciprocating the carriage 40 along the axis of the platen 36 includes a sliding shaft 33 that slidably holds the carriage 40 arranged in parallel with the axis of the platen 36, a pulley 32 that is combined with the carriage motor 30 to span an endless drive belt 31 therebetween, and a position detection sensor 34 that detects the position of the origin of the carriage 40.

The mechanism of feeding the printing paper P has the platen 36, the sheet feed motor 35 that rotates the platen 36, a sheet feed assist roller (not shown), and a gear train (not shown) that transmits the rotations of the sheet feed motor 35 to the platen 36 and the sheet feed assist roller. The printing paper P is set between the platen 36 and the sheet feed assist roller and fed by a predetermined quantity corresponding to the angle of rotation of the platen 36.

The control circuit 60 includes a CPU 61, a ROM 62, and a RAM 63 and controls the diverse mechanisms of the color printer 20. More specifically the control circuit 60 regulates the operations of the carriage motor 30 and the sheet feed motor 35 to control main scan and sub-scan of the carriage 40, while controlling ejection of ink droplets from respective nozzles based on the image data FNL supplied from the computer 80. Ink dots are accordingly formed at adequate positions on the printing paper.

An ink cartridge 42 for keeping black (K) ink therein and an ink cartridge 43 for keeping color inks cyan (C), magenta (M), and yellow (Y) therein are attached to the carriage 40. The K ink and one or plural other inks may be kept in an identical ink cartridge. The arrangement of keeping plural inks in one ink cartridge desirably reduces the total space required for the ink cartridges.

When the ink cartridges 42 and 43 are attached to the carriage 40, each ink kept in the ink cartridge flows through an ink conduit (not shown) and is supplied to corresponding one of ink ejection heads 44 through 47 provided for the respective colors. Each supply of ink is then ejected from the corresponding one of the ink ejection head 44 through 47 under control of the control circuit 60.

Figure 4:
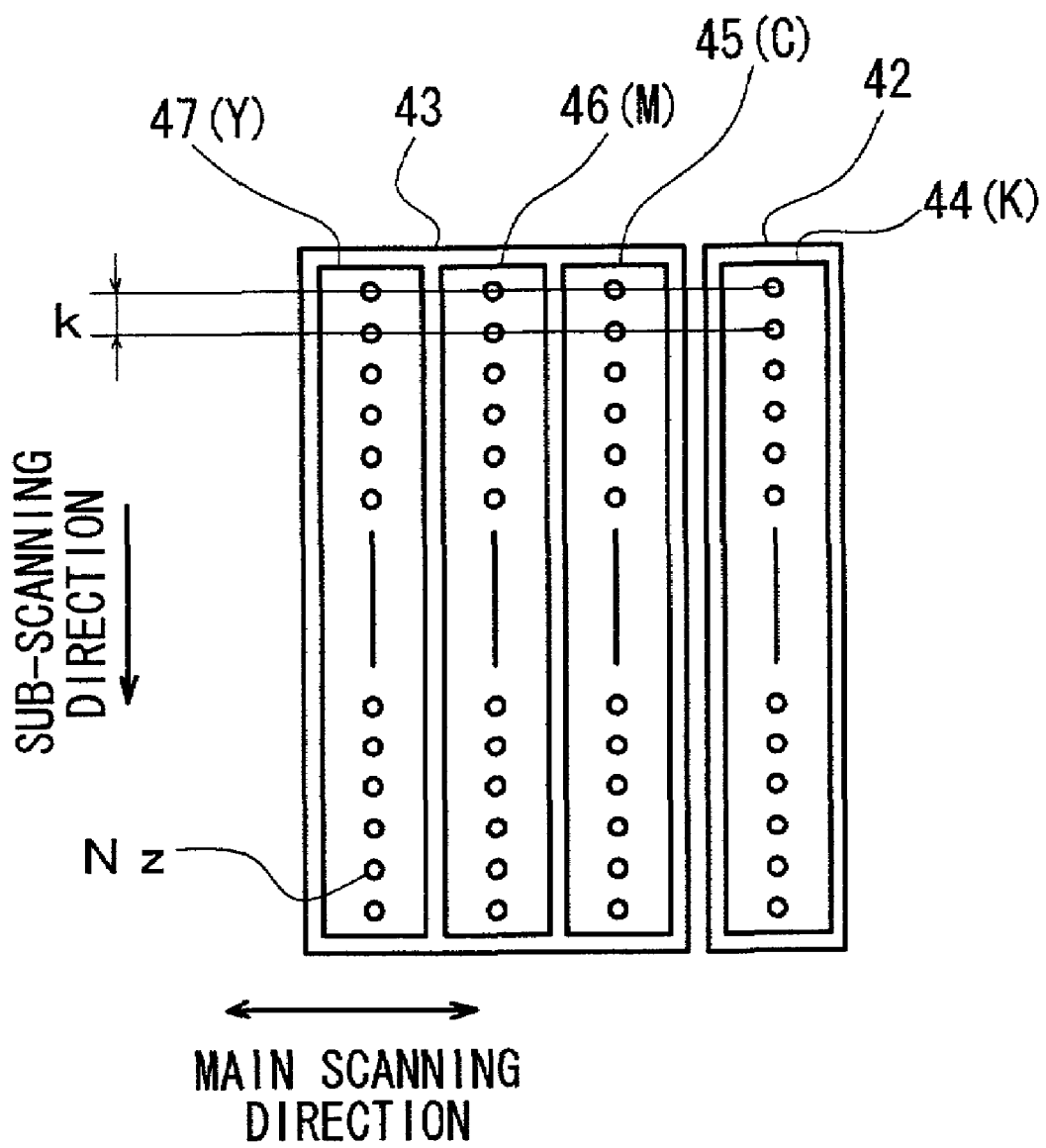
FIG. 4 shows an arrangement of nozzles on ink ejection heads in the color printer of the embodiment.

FIG. 4 shows an arrangement of ink jet nozzles Nz on the ink ejection heads 44 through 47. As illustrated, four nozzle arrays for ejecting respective color inks are formed in the sequence of K, C, M, and Y on the bottom of the ink ejection heads. Each nozzle array includes 48 nozzles Nz aligned at a preset nozzle pitch k.

In the color printer 20 having the above hardware construction, the carriage motor 30 is driven to move the ink ejection heads 44 through 47 of the respective colors relative to the printing paper P in a main scanning direction. The sheet feed motor 35 is driven to move the printing paper P in a sub-scanning direction. The color printer 20 actuates the nozzles at adequate timings to eject ink droplets while repeating main scan and sub-scan of the carriage 40 under control of the control circuit 60, thus printing a resulting color image on the printing paper P.

A-2. Saturation Enhancement Process

As described previously with FIG. 2, in the printing system of the embodiment, the saturation enhancement module 94 enhances the saturation (chroma) of pre-stored hues to print a high-quality image faithfully reproducing the genuine colors of the original color image. The following describes the processing of the saturation enhancing module 94, that is, the saturation (chroma) enhancement process.

Figure 5:
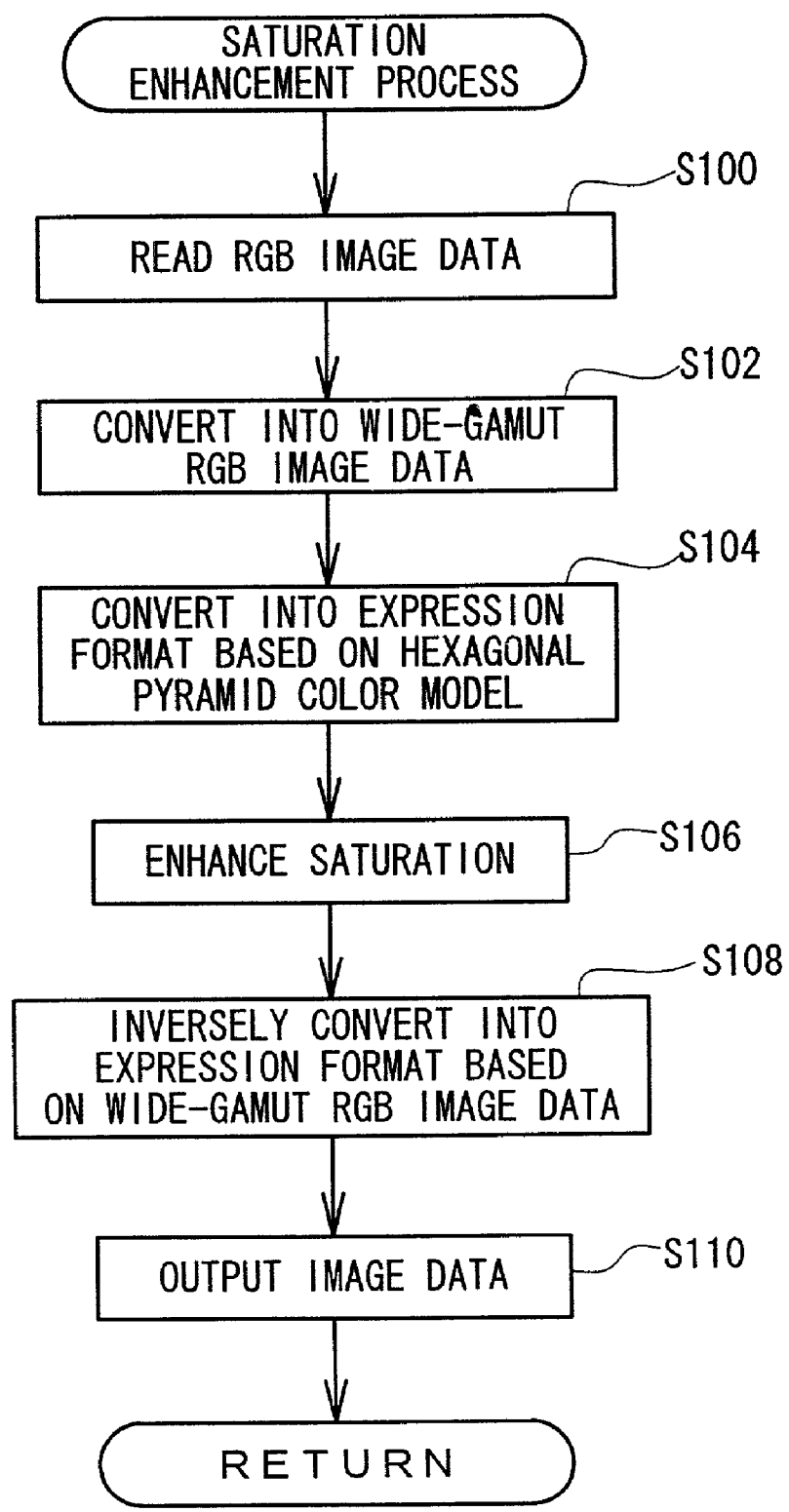
FIG. 5 is a flowchart showing the saturation enhancement process carried out in the first embodiment.

FIG. 5 is a flowchart showing the saturation enhancement process carried out in the first embodiment. The CPU 81 in the computer 80 executes this processing routine. The details of the processing are discussed below with reference to the flowchart of FIG. 5.

When the program enters the saturation enhancement routine, the CPU 81 first reads RGB image data from the resolution conversion module 93 (step S100). The resolution conversion module 93 receives image data in an sRGB color system. The RGB image data input into the CPU 81 at step S100 is accordingly expressed in the sRGB color system that gives a narrow color gamut to the color printer.

The image data in the sRGB color system is then converted into image data in a wide gamut RGB color system (step S102). The wide gamut RGB color system is a format of image data newly provided in this embodiment to have a wider color gamut than that of the sRGB color system. FIG. 6 is an xy chromaticity diagram showing comparison between the color gamut in the sRGB color system and the color gamut in the wide gamut RGB color system. Image data expressed in the sRGB color system specify colors in a range surrounded by the broken line in FIG. 6 by varying RGB tone levels Rs, Gs, and Bs of the image data in the range of 0 to 255. Image data expressed in the wide gamut RGB color system, on the other hand, specify colors in a range surrounded by the solid line in FIG. 6 by varying RGB tone levels Rw, Gw, and Bw of the image data in the range of 0 to 255. The image data in the wide gamut RGB color system is set to express the color gamut reproducible by the color printer 20. Saturation (chroma) of the image data expressed in the sRGB color system having the narrow color gamut can not be enhanced to exceed the color gamut specified by the sRGB color system. The process of the embodiment converts image data in the sRGB color system to image data in the wide gamut RGB color system and subsequently enhances the image data expressed in the wide gamut RGB color system. This arrangement accordingly allows enhancement to the high saturation (chroma), which can not be attained in the sRGB color system.

The conversion from the image data Rs, Gs, Bs in the sRGB color system to the image data Rw, Gw, Bw in the wide gamut RGB color system is readily implemented by linear mapping. FIG. 7 conceptually shows linear mapping to convert image data in the sRGB color system into image data in the wide gamut RGB color system. As shown in FIG. 7(a), a matrix $B^{-1}A$ functions to convert the image data Rs, Gs, and Bs in the sRGB color system to the image data Rw, Gw, and Bw in the wide gamut RGB color system. Here the matrix A is a 3×3 matrix for converting the image data Rs, Gs, and Bs into tristimulus values X, Y, and Z in an X-Y-Z color system as shown in FIG. 7(b). The tristimulus values X, Y, and Z are normalized under the condition of X+Y+Z=1, and only the normalized tristimulus value X (that is, the coordinate x) and the normalized tristimulus value Y (that is, the coordinate y) are shown in the xy chromaticity diagram of FIG. 6. The matrix B is a 3×3 matrix for converting the image data Rw, Gw, and Bw into the tristimulus values X, Y, and Z in the X-Y-Z color system as shown in FIG. 7(c). $B^{-1}$ represents an inverse matrix of the matrix B. The sRGB color system is an existing color system, and the elements of the matrix A are automatically specified by the chromaticity coordinates of the respective colors R, G, and B and a white point. The wide gamut RGB color system is, on the other hand, set according to the color gamut of the color printer, in order to attain the greater color gamut than that of the sRGB color system and the whole color gamut reproducible by the color printer. The matrix B accordingly takes diverse values based on the settings of the wide gamut RGB color system.

The relationship among the image data in the sRGB color system, the wide gamut RGB color system, and the X-Y-Z color system and the matrixes A and B may be defined as follows. The matrix A functions to converts the input image data in the sRGB color system into the image data in the X-Y-Z color system. The matrix $B^{-1}$ functions to convert the obtained image data in the X-Y-Z color system into the image data in the wide gamut RGB color system. Namely the matrix $B^{-1}A$ functions to convert the input image data in the sRGB color system into the image data in the wide gamut RGB color system. At step S102 in FIG. 5, the image data Rw, Gw, and Bw in the wide gamut RGB color system are accordingly calculated through the operation of the matrix $B^{-1}A$ on the image data Rs, Gs, and Bs in the sRGB color system.

After conversion of the input image data into the image data in the wide gamut RGB color system that attains colors of high saturation (chroma) at step S102 in the flowchart of FIG. 5, the program converts the image data in the wide gamut RGB color system into an expression format called 'hexagonal pyramid color model'. The hexagonal pyramid color model converts the image data expressed by the R, G, and B tone levels into an expression format defined by the hue, the saturation (chroma), and the lightness. Conversion of the RGB image data into data of the hue (H), the saturation (chroma) (S), and the lightness (I) used in the hexagonal pyramid color model is easier than conversion of the RGB image data into data of L*, a*, and b* used in an L*a*b* color system. The hexagonal pyramid color model is thus widely used as the technique that readily deals with the hue, the saturation (chroma), and the lightness of images.

Figure 8:
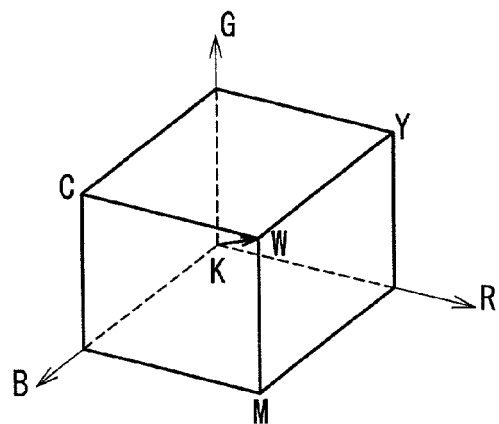
FIG. 8 shows the orthogonal coordinates of the RGB image data where the respective orthogonal axes represent the R, G, and B axes.
Figure 9:
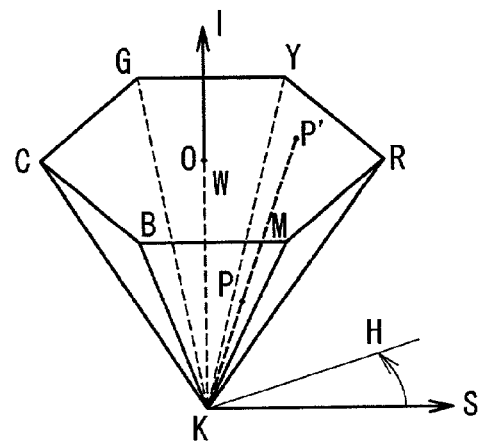
FIG. 9 conceptually shows a hexagonal pyramid color mode.
Figure 10:
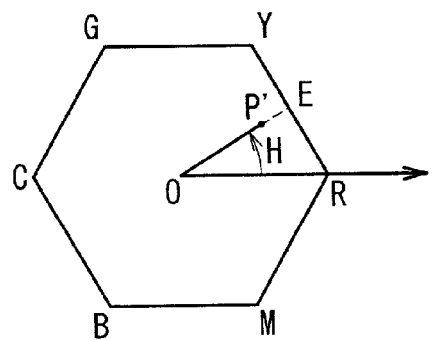
FIG. 10 shows a process of calculating the saturation (chroma) S and the hue H in the hexagonal pyramid color mode.

The following describes the outline of the hexagonal pyramid color model with reference to FIGS. 8 to 10. FIG. 8 shows the orthogonal coordinates of the RGB image data where the respective orthogonal axes represent the R, G, and B axes. Each RGB image data is expressible as a point in a cube of 255 in length of each side (color solid). For example, image data of black (K) has the R, G, and B tone levels all equal to 0, so that black is expressed as a point of coordinates values (0, 0, 0). The image data of white (W) has the R, G, and B tone levels all equal to 255, so that white is expressed as a point of coordinate values (255, 255, 255). In a similar manner, red (R), green (G), and blue (B) are respectively defined by sets of coordinates values (255, 0, 0), (0, 255, 0), and (0, 0, 255). Cyan (C) complementary to red (R) corresponds to a set of coordinate values (0, 255, 255) facing the apex R. Magenta (M) complementary to green (G) corresponds to a set of coordinate values (255, 0, 255) facing the apex G. Yellow (Y) complementary to blue (B) corresponds to a set of coordinate values (255, 255, 0) facing the apex B.

In the hexagonal pyramid color model, the K-W axis of the color solid is set to an axis I, and each coordinate in the color solid is projected on a plane perpendicular to the axis I. The saturation (chroma) S and the hue H of the image data are computed on the projected plane. The lightness I is calculated immediately from the coordinate in the color solid. For example, when the image data (R, G, B) is given, the lightness I is calculated according to Equation (1) given below:

$$I = \max(R, G, B) \quad (1)$$

Here max (R, G, B) denotes the function of selecting the maximum value among R, G, and B. When the image data (R, G, B) is given as a point P in the color solid, the saturation (chroma) S and the hue H are computed from the coordinates of a point P', which is obtained by projecting the point P onto the plane perpendicular to the axis I as shown in FIG. 9.

FIG. 10 shows a process of calculating the saturation (chroma) S and the hue H in the hexagonal pyramid color mode. The apexes R, Y, G, C, M, and B of the color solid are projected to apexes of a regular hexagon shown in FIG. 10, while the apex or W of the color solid is projected to a center O of the regular hexagon. As clearly understood, in the expression with the hexagonal pyramid color mode, the center of the regular hexagon (the point O) represents achromatic color, and the saturation (chroma) increases with an increase in distance from the point O. The maximum saturation (chroma) is given when the distance reaches the circumference of the regular hexagon. As shown in FIG. 10, when a point E is an intersection of the straight line connecting the point P' with the point O and the circumference of the regular hexagon, the saturation (chroma) S is expressed by the (length of straight line OP')/(length of straight line OE). More concretely, when the RGB image data of the point P is given, the saturation (chroma) S is calculated by Equation (2) given below:

$$S = 255 * (I-i)/I \quad (2)$$

Here i=min (R, G, B), which represents the function of selecting the minimum value among R, G, and B. I represents the lightness I calculated according to Equation (1). As seen from Equation (2), the saturation (chroma) S is indeterminate when the lightness I=0.

As clearly understood from the fact that the apexes of the color solid representing R, Y, G, C, B, and M are projected to the respective apexes of the regular hexagon expressed as R, Y, G, C, B, and M in FIG. 10, the hue H is defined by the angle of the straight line OR and the straight line OP' in the hexagonal pyramid color model. More concretely, when the RGB image data of the point P is given, the hue H is determined by one of Equations (3) to (5) given below:

When R=I, $$H = 255(b-g)/6 \quad (3)$$

When G=I, $$H = 255(2+r-b)/6 \quad (4)$$

When B=I, $$H = 255(4+g-r)/6 \quad (5)$$

Here r=(I−R)/(I−i), g=(I−G)/(I−i), and b=(I−B)/(I−i). When H<0, 255 is added to the value H.

The process of step S104 in FIG. 5 applies Equations (1) to (5) given above to the converted wide gamut RGB image data or the RGB tone data Rw, Gw, Bw to calculate the lightness I, the saturation (chroma) S, and the hue H in the hexagonal pyramid color model. This processing converts the RGB tone data Rw, Gw, and Bw that may take the values in the range of 0 to 255 into the lightness I, the saturation (chroma) S, and the hue H that may take the values in the range of 0 to 255.

The CPU 81 in the computer 80 then enhances the saturation (chroma) of the converted image data (step S106). Since the image data is converted into the specific expression format defined by the lightness, I, the saturation (chroma) S, and the hue H at step S104, the process can readily enhance only the saturation (chroma) without affecting the hue.

Enhancement of saturation (chroma) is implemented by multiplying the saturation (chroma) S by an enhancement coefficient Kh (0≦Kh), which is stored in advance as the function of the hue H. Namely enhanced saturation (chroma) Se is expressed as:

$$Se = (1+Kh)S \quad (6)$$

As seen from Equation (6), saturation (chroma) is not enhanced when the enhancement coefficient Kh=0, while being enhanced when the enhancement coefficient Kh has a value greater than 0.

Figure 11:
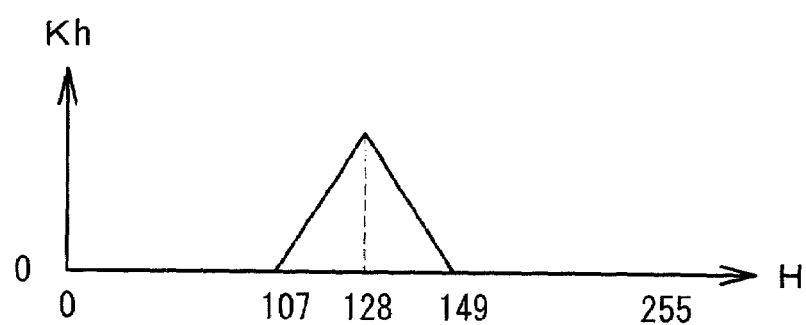
FIG. 11 shows an example of the enhancement coefficient Kh stored as the function of the hue H.

FIG. 11 shows an example of the enhancement coefficient Kh stored as the function of the hue H. In this example, in order to enhance saturation (chroma) in the hue range of G (green) to B (blue), the enhancement coefficient Kh is set to take values greater than 0 in a range from H=107 corresponding to the hue G to H=149 corresponding to the hue B. The enhancement coefficient Kh is set equal to 0 for the residual values of H. The method of enhancing the saturation (chroma) with the preset enhancement coefficient Kh ensures enhancement of saturation (chroma) only in a predetermined range of hues without affecting saturation (chroma) of other hues.

As shown in FIG. 11, the enhancement coefficient Kh is set to be continuous against the hue H. The continuous variation does not abruptly enhance a specific hue but ensures enhancement in saturation (chroma) of hue without damaging the natural touch. Although the enhancement coefficient Kh is set to linearly vary against the hue H in the example of FIG. 11, the setting may cause the enhancement coefficient Kh to smoothly vary against the hue H by utilizing trigonometric functions or polynomials. The setting of making the enhancement coefficient Kh smoothly vary against the hue H ensures the natural touch of the enhanced image. In the example of FIG. 11, saturation (chroma) is enhanced in the range of H=107 to H=149. The enhancement of saturation (chroma) is not restricted to this range, but the range of hues for which saturation (chroma) is to be enhanced is adjusted to give better printed images.

In the example of FIG. 11, the enhancement coefficient Kh is set as the function of only the hue H. One possible modification sets the enhancement coefficient Kh as the function of the saturation (chroma) S and the lightness I in addition to the hue H. Another possible modification stores a mapping of a correction coefficient Ks to the saturation (chroma) S, enhances the saturation (chroma) S with the enhancement coefficient Kh, and corrects the enhanced saturation (chroma) with the correction coefficient Ks (1≦Ks). Namely the enhanced saturation (chroma) Se may be expressed as:

$$Se = Ks(1+Kh)S \quad (7)$$

Figure 12:
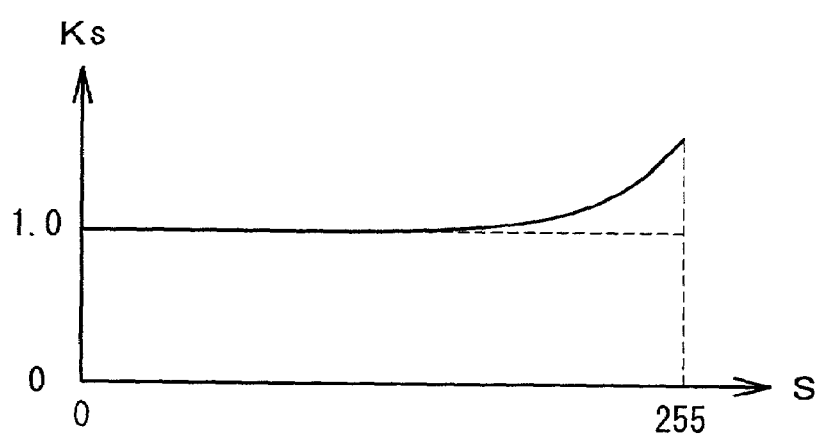
FIG. 12 shows an example of the preset correction coefficient Ks.

FIG. 12 shows an example of the preset correction coefficient Ks. As illustrated, the correction coefficient Ks is set to attain little enhancement in the range of low saturation (chroma) S and strong enhancement in the range of high saturation (chroma) S. As discussed previously with FIG. 16, in order to allow expression of sRGB image data of the narrow color gamut, the image data of high saturation (chroma) is converted to data of low saturation (chroma). Image data of relatively low saturation (chroma) is treatable in the sRGB color system without any conversion, so that it is not required to convert such data into data of lower saturation (chroma). The desirable setting thus strongly enhances the high-saturation image data, while hardly enhancing the low-saturation image data. Such setting gives processed image data sufficiently close to original image data. The arrangement of setting the correction coefficient Ks as shown in FIG. 12 adequately enhances saturation and enables images of higher picture quality to be printed.

After calculation of the enhanced saturation (chroma) Se at step S106 in FIG. 5, the process inversely converts the image data expressed by the set of lightness I, enhanced saturation (chroma) Se, and hue H in the hexagonal pyramid color model into image data in the wide gamut RGB color system (step S108). More concretely, image data Rwe, Gwe, and Bwe in the wide gamut RGB color system are calculated from the image data in the hexagonal pyramid color mode according to the following equations.

When the enhanced saturation Se=0, the respective tone levels R, G, and B in the wide gamut RGB color system are obtained by:

$$Rwe=Gwe=Bwe=I \qquad (8)$$

When the enhanced saturation Se≠0, the process first specifies h, P, Q, and T as follows:

$$h=\text{int}(6H/255)$$

$$P=I \cdot (1-Se)$$

$$Q=I \cdot \{1-Se \cdot (H-h)\}$$

$$T=I \cdot \{1-Se \cdot (1-H+h)\}$$

Here int(X) represents the function of giving the maximum integer of not greater than X. The process applies an adequate equation among Equations (9) to (14) given below according to the value of h and thereby specifies the RGB tone levels Rw, Gw, and Bw in the wide gamut RGB color system.

When h=0, $$Rwe=I, Gwe=T, Bwe=P \qquad (9)$$

When h=1, $$Rwe=Q, Gwe=I, Bwe=P \qquad (10)$$

When h=2, $$Rwe=P, Gwe=I, Bwe=T \qquad (11)$$

When h=3, $$Rwe=P, Gwe=Q, Bwe=I \qquad (12)$$

When h=4, $$Rwe=T, Gwe=P, Bwe=I \qquad (13)$$

When h=5, $$Rwe=I, Gwe=P, Bwe=Q \qquad (14)$$

The process of step S108 in FIG. 5 applies one of Equations (8) to (14) given above to the image data expressed by the set of lightness I, enhanced saturation Se, and hue H to calculate the image data Rwe, Gwe, and Bwe in the wide gamut RGB color system.

When enhancement of saturation (chroma) according to the above procedure is completed for all the image data read at step S100, the saturation (chroma)-enhanced image data Rwe, Gwe, and Bwe in the wide gamut RGB color system are output to the color conversion module 95 shown in FIG. 2 (step S110). The program exits from the saturation enhancement routine on completion of output of all the processed image data.

The color conversion module 95 receives the saturation-enhanced image data Rwe, Gwe, and Bwe in the wide gamut RGB color system and refers to the color conversion table LUT to convert the input image data into tone data of the respective colors C, M, Y, and K. The color conversion table LUT to be referred to is specifically set to convert RGB tone data in the wide gamut RGB color system into CMYK tone data and is stored in advance in the printer driver 92 (see FIG. 2). The halftoning process and the interlace process are then carried out, based on the CMYK tone data thus obtained. Resulting image data FNL are supplied to the color printer 20. The resulting printed image has high picture quality and high saturation (chroma) in the predetermined range of hues from green to blue. This procedure enables colors of high saturation, for example, clear blue green of rafting or mountain stream, which is certainly expressed by silver halide photographs but is not expressible by the prior art technique, to be printed with the color printer.

As discussed above, the procedure of the first embodiment converts RGB image data into a specific expression format using the hexagonal pyramid color model, enhances saturation (chroma) of the converted image data, and inversely converts the saturation-enhanced image data into the RGB image data. The procedure enables an image of high picture quality reproducing colors sufficiently close to the original colors to be printed from the input image data in the sRGB color system having the narrow color gamut. Conversion of the RGB image data into the specific format using the hexagonal pyramid color model and re-conversion of the data in the hexagonal pyramid color model into the RGB image data are implemented relatively readily. This ensures the high-speed saturation enhancement process and thereby enables high-quality images to be printed at high speed.

B. Second Embodiment

The first embodiment discussed above carries out the saturation conversion process after conversion of RGB image data into a specific expression format using the hexagonal pyramid color model. Expression of image data in an L*a*b* color system is also widely used as the method of defining a color image by the set of lightness, saturation, and hue. A second embodiment of the present invention discussed below carries out the saturation conversion process after conversion of image data in the sRGB color system into image data in the L*a*b* color system.

B-1. Saturation Enhancement Process

Figure 13:
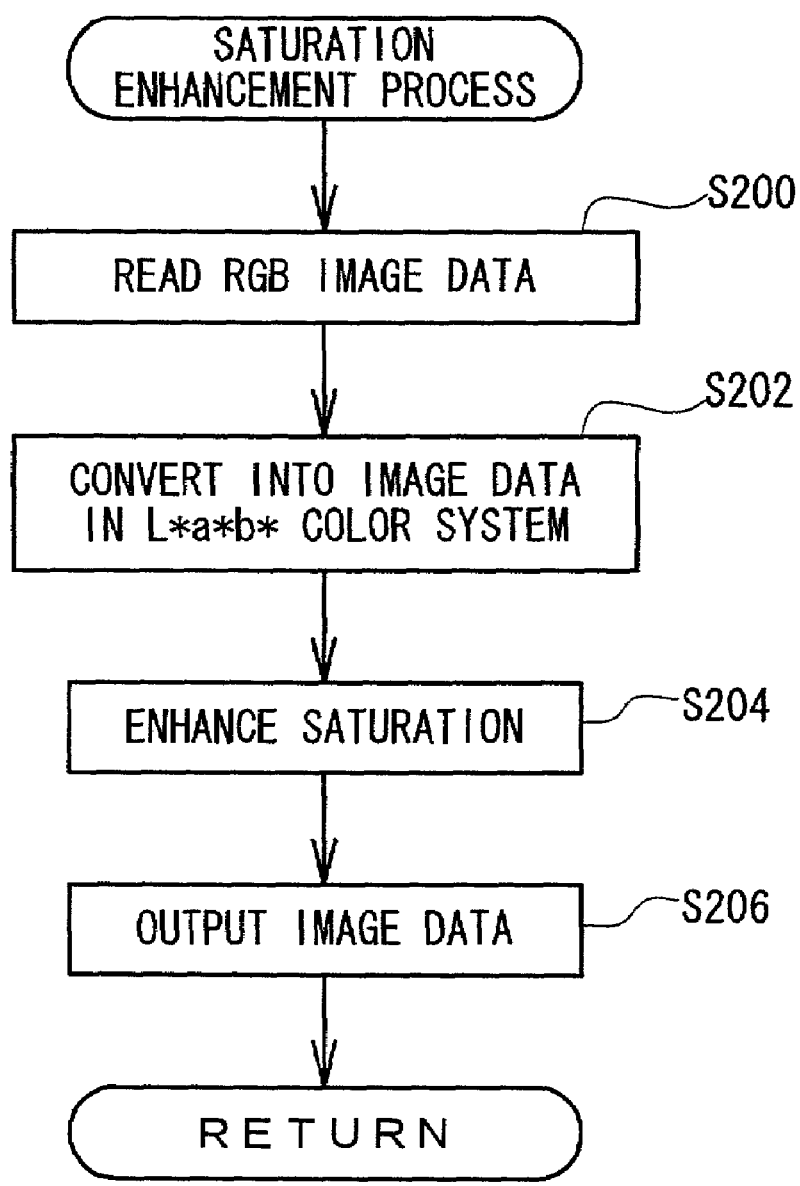
FIG. 13 is a flowchart showing a saturation enhancement process carried out in the second embodiment.

FIG. 13 is a flowchart showing a saturation enhancement process carried out in the second embodiment. This processing routine is executed by the CPU 81 in the computer 80. The series of processing is described according to the flowchart of FIG. 13.

When the program enters the saturation enhancement routine, the CPU 81 first reads RGB image data from the resolution conversion module 93 (step S200). The resolution conversion module 93 receives the image data in the sRGB color system. The RGB image data read by the CPU 81 at step S200 is accordingly image data expressed in the sRGB color system having the narrow color gamut for the color printer.

On completion of reading the RGB image data, the CPU 81 converts the image data in the sRGB color system into image data in the L*a*b* color system (step S202). The L*a*b* color system is set to improve the disadvantages of the XYZ color system mentioned above. Each color is expressed by a set of coordinates along the three axes L*, a*, and b*, which are perpendicular to one another. The space defined by the L*, a*, and b* axes is referred to as the L*a*b* color space.

Expression of the image data in the L*a*b* color system advantageously allows processing of image data in the form relatively close to the human perception. For example, the distance between two sets of coordinates representing different colors on the L*a*b* color space well agrees with the perceptive distance between these colors. Namely conversion of the image data into the L*a*b* color system ensures adequate image processing that well agrees with the human perception.

The coordinate values in the L*a*b* color space are calculated from the given RGB image data via the image data in the XYZ color system according to Equations (15) to (17) given below:

$$L^* = 116 \cdot (Y/Y0)^{1/3} - 16 \quad (15)$$

$$a^* = 500 \cdot \{(X/X0)^{1/3} - (Y/Y0)^{1/3}\} \quad (16)$$

$$b^* = 200 \cdot \{(Y/Y0)^{1/3} - (Z/Z0)^{1/3}\} \quad (17)$$

Here X, Y, and Z are tristimulus values in the XYZ color system and are obtained by applying the matrix A shown in FIG. 7 to the respective tone levels of the RGB image data. X0, Y0, and Z0 are tristimulus values of reference white. In this manner, the process of step S202 converts the image data in the sRGB color system into image data in the L*a*b* color system.

The CPU 81 of the computer 80 enhances saturation (chroma) of the image data expressed in the L*a*b* color system with regard to a preset range of hues (step S204). In the L*a*b* color system, the hue θ and saturation C are expressed by Equations (18) and (19) given below:

$$\theta = a \tan(b^*/a^*) \quad (18)$$

$$C = \sqrt{\{(b^*)^2 + (a^*)^2\}} \quad (19)$$

The value L* represents lightness. The procedure of the second embodiment separately handles the hue θ and the saturation C and thus enables enhancement of only saturation (chroma) without affecting the hue.

The saturation enhancement process executed in the second embodiment is similar to the processing of the first embodiment discussed above, except the following differences. Whereas the procedure of the first embodiment handles the saturation S, the hue H, and the lightness I based on the hexagonal pyramid color mode, the procedure of the second embodiment handles the saturation C, the hue θ, and the lightness L* based on the L*a*b* color system. The saturation enhancement process of the first embodiment (step S106 in FIG. 5) is thus applicable to the procedure of the second embodiment by replacing the saturation S and the hue H with the saturation C and the hue θ. The following describes the saturation enhancement process executed in the second embodiment by applying the saturation enhancement process of the first embodiment with required modifications.

The procedure of the second embodiment enhances saturation with an enhancement coefficient Kθ stored in advance. Equation (6a) given below calculates the enhanced saturation in the second embodiment and uses the saturation C and the enhancement coefficient Kθ(0≦Kθ) in place of the saturation S and the enhancement coefficient Ks in Equation (6) used in the first embodiment.

$$Ce = (1 + K\theta)C \quad (6a)$$

The enhancement coefficient Kθ is stored in advance as the function of the hue θ. This process is described briefly with reference to FIG. 11 used in the first embodiment. In the L*a*b* color system, the hue θ may take the value of 0 to 2π. Green, cyan and blue substantially correspond to θ=5π/6, to θ=7π/6, and to θ=4π/3, respectively. The enhancement coefficient Kθ is accordingly set to be equal to 0 in the range of hue θ of 0 to 5π/6, gradually increase in the range of hue θ of 5π/6 to 7π/6, gradually decrease to 0 in the range of hue θ of 7π/6 to 4π/3, and be equal to 0 in the range of hue θ of 7π/6 to 2π. Namely the procedure enhances the saturation with the enhancement coefficient Kθ set relative to the hue θ. This arrangement ensures enhancement of saturation only in a predetermined range of hues without affecting saturation of other hues.

In the second embodiment, the arrangement of setting the continuous value to the enhancement coefficient Kθ relative to the hue θ does not abruptly enhance a specific hue but enables enhancement of saturation of the image without damaging the natural touch. The setting may vary the value of the enhancement coefficient Kθ relative to the hue θ linearly or along a curve. Like the first embodiment, the value of the enhancement coefficient Kθ may be set to vary relative to the saturation C and the lightness L* in addition to the hue θ.

After calculation of the enhanced saturation Ce at step S204 in FIG. 13 according to the above procedure, the CPU 81 of the computer 80 outputs the image data expressed by the lightness L*, the enhanced saturation Ce, and the hue θ to the color conversion module 95 (see FIG. 2). On completion of output of all the image data, the program exits from this saturation enhancement process.

The color conversion module 95 of the second embodiment receives the image data with the enhanced saturation (chroma), refers to the color conversion table LUT, and converts the input image data into the tone data of the respective colors C, M, Y, and K. The color conversion table LUT to be referred to is specifically set to convert the image data expressed by the lightness L*, the saturation Ce, and the hue θ into tone data of the respective colors C, M, Y, and K and is stored in advance in the printer driver 92. The halftoning process and the interlacing process are carried out, based on the tone data of the CMYK colors thus obtained. The resulting image data FNL is supplied to the color printer 20, which then prints a high-quality image including colors of high saturation (chroma) in the hue range of green to blue. This procedure enables colors of high saturation, for example, clear blue green of rafting or mountain stream, which is certainly expressed by silver halide photographs but is not expressible by the prior art technique, to be printed with the color printer.

The second embodiment discussed above converts the RGB image data into the image data in the L*a*b* color system, prior to enhancing the saturation of the image. This ensures adequate enhancement of saturation (chroma) according to the human perception. The L*a*b* color system handles image data in a wider color gamut and thus enables enhancement of saturation of the image over the range expressible in the sRGB color system.

B-2. Modification

In the procedure of the second embodiment, an adequate value is set in advance to the degree of enhancement of saturation. One possible modification may change over the degree of enhancement of saturation (chroma) while checking the printed image. Respective original color images include different degrees of high-saturation colors. It is accordingly thought that respective color image data have different optimum degrees of enhancement of saturation. In some cases, the original color image does not include any high-saturation hues, and enhancement of saturation may cause an unnatural printed image. A modified example discussed below changes over the degree of enhancement of saturation or even prohibits enhancement of saturation in some cases, in order to print images of higher picture quality.

Figure 14:
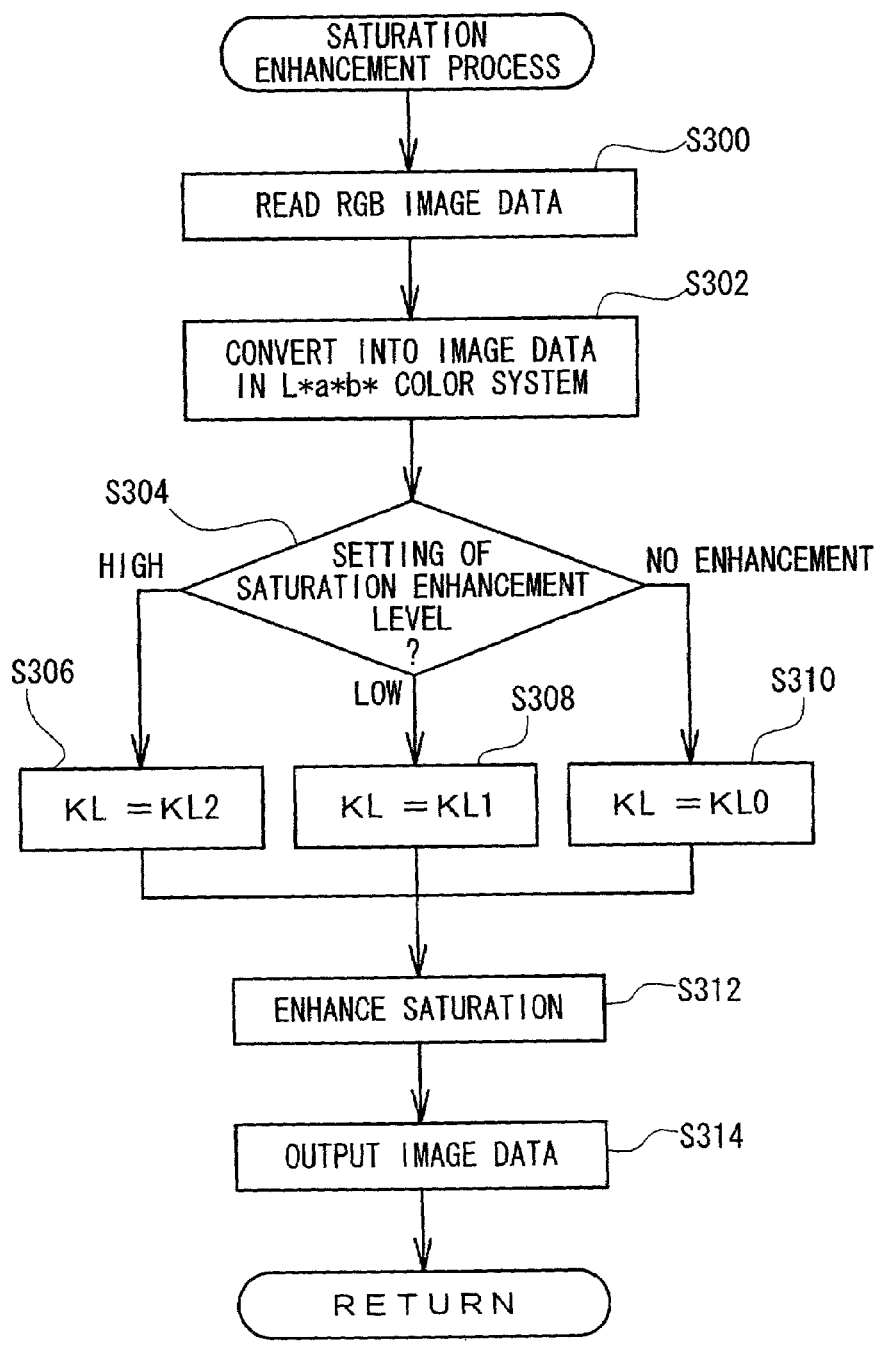
FIG. 14 is a flowchart showing another saturation enhancement process as a modified example of the second embodiment.

FIG. 14 is a flowchart showing another saturation enhancement process as a modified example of the second embodiment. The following describes this modified enhancement saturation process with reference to the flowchart of FIG. 14.

In the modified saturation enhancement process, the process first reads RGB image data expressed in the sRGB color system from the resolution conversion module 93 (step S300), and then converts the input image data into image data in the L*a*b* color system (step S302). The conversion of image data follows the procedure of the second embodiment.

The CPU 81 subsequently specifies the setting of the saturation enhancement level (step S304). Selected one of the saturation enhancement levels 'High', 'Low', and 'No Enhancement' is set in advance in the printer driver 92. The process detects the preset saturation enhancement level.

After specification of the setting of the saturation enhancement level, the process sets an enhancement level coefficient KL according to the setting. The process substitutes a constant KL2 into the enhancement level coefficient KL under the setting of the saturation enhancement level 'High' (step S306), a constant KL1 into KL under the setting of the saturation enhancement level 'Low' (step S308), and a constant KL0 into KL under the setting of the saturation enhancement level 'No Enhancement' (step S310). The values of the respective constants KL2, KL1, and KL0 are stored in advance in the printer driver 92.

Figures 15, 16:
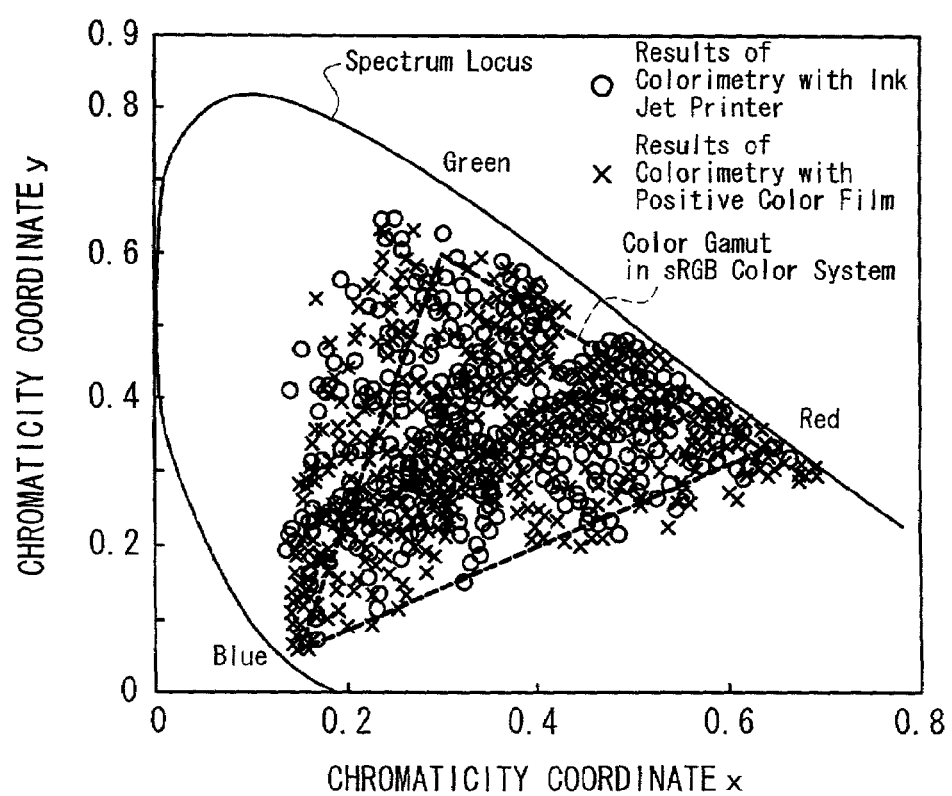
FIG. 15 shows an example of settings of an enhancement level coefficient in the printing system of the second embodiment.
FIG. 16 shows the relationship among the color gamut of the color printer, the color gamut of the positive color film, and the color gamut in the sRGB color system.

FIG. 15 shows one example of the settings of the constants KL2, KL1, and KL0 in the printer driver 92. In the illustrated example, the values '1.5', '1', and '0' are respectively stored as the constants KL2, KL1, and KL0. The settings of these constants are changeable on the window of the computer.

After setting the value of the enhancement level coefficient KL, the process actually enhances saturation (step S312). The enhancement saturation practically follows the procedure of the second embodiment, except that the modified process uses Equation (6b) given below for enhancement of saturation, in place of Equation (6a) used in the procedure of the second embodiment:

$$Ce=(1+KL \cdot K\theta)C \qquad (6b)$$

Here Ce denotes the enhanced saturation, $K\theta$ denotes the enhancement coefficient, and KL denotes the enhancement level coefficient. Like the second embodiment, the enhancement coefficient $K\theta$ is stored in advance as the function of the hue $\theta$. As clearly understood from Equation (6b), in the case where the saturation enhancement level 'Low' is set in the printer driver 92, for example, the value '1' is substituted into KL. Saturation is accordingly enhanced according to the setting of the enhancement coefficient $K\theta$. In the case where the saturation enhancement level 'High' is set, the value '1.5' is substituted into KL. The saturation is accordingly enhanced by a higher degree than the setting of the enhancement coefficient $K\theta$. In the case where the saturation enhancement level 'No Enhancement' is set, the value '0' is substituted into KL. No enhancement of saturation is accordingly carried out. The process of step S312 in FIG. 14 computes the enhanced saturation Ce in this manner.

After the calculation of the enhanced saturation Ce, the CPU 81 of the computer 80 outputs the image data expressed by the lightness L*, the enhanced saturation Ce, and the hue $\theta$ to the color conversion module 95 (see FIG. 2) (step S314). On completion of output of all the image data, the program exits from this saturation enhancement process.

In the modified example discussed above, the degree of enhancement of saturation is selectable among a plurality of settings. The adequate degree of enhancement of the saturation in the color image may depend upon the contents of the image to be printed. The arrangement of selecting the adequate setting among the plurality of enhancement degrees optimizes the degree of enhancement of saturation and enables high-quality images to be printed.

The above embodiments are to be considered in all aspects as illustrative and not restrictive. There may be many modifications, changes, and alterations without departing from the scope or spirit of the main characteristics of the present invention.

For example, the above series of processing to enhance the saturation of color image data may be actualized by the function of a printer driver for controlling the color printer or by a plug-in software program that is incorporated in any of diverse application programs used to supply color image data to the printer driver and enhances the saturation according to the type of the color printer.

The software program (application program) that actualizes the above functions may be supplied to the main memory of the computer system or an external storage device via a communication line and executed.

What is claimed is:

1. A print control apparatus that controls a printing unit, which applies multiple color inks on a printing medium to print a color image, said print control apparatus comprising:
    an image data input module that receives an input of color image data;
    a hue storage module that stores in advance a predetermined range of hues for which saturation is to be enhanced;
    a saturation enhancement module that converts the input color image data into image data expressed in a color system that can independently handle the saturation and, with regard to the predetermined range of hues of the image data, enhances the saturation of the image data in such a way that the gradation of saturation of the original image data is maintained;
    a conversion module that converts the image data with the enhanced saturation into image data for printing;
    an ink application density specification module that specifies an application density of ink to be applied on the printing medium with regard to each of the multiple color inks, based on the color image data that has the enhanced saturation in the predetermined range of hues and has been converted into image data for printing; and
    a control signal output module that outputs the specified application density of each color ink as a control signal to said printing unit.

2. A print control apparatus in accordance with claim 1, wherein said hue storage module stores hues of blue to green as the predetermined range of hues.

3. A print control apparatus in accordance with claim 1, said print control apparatus further comprising:
an expression format conversion module that converts the color image data into data of another expression format using saturation, hue, and lightness,
wherein said saturation enhancement module receives the data converted to the another expression format and changes data representing the saturation in the predetermined range of hues to data representing higher saturation.

4. A print control apparatus in accordance with claim 1, wherein said saturation enhancement module enhances the saturation by a greater degree with an increase in saturation of the color image data in the predetermined range of hues.

5. A print control apparatus in accordance with claim 1, wherein said saturation enhancement module comprises:
an image data conversion module that converts the color image data into a wide gamut color image data that is capable of expressing higher saturation than saturation expressible by the color image data,
said saturation enhancement module enhancing the saturation after the conversion of the input color image data into the wide gamut color image data.

6. A print control apparatus in accordance with claim 1, wherein said saturation enhancement module comprises:
an enhancement degree storage module that stores in advance a plurality of different degrees of enhancement for saturation of the color image data; and
an enhancement degree selection module that selects one enhancement degree among the plurality of different enhancement degrees stored,
said saturation enhancement module enhancing the saturation of the color image data according to the selected enhancement degree.

7. A print control apparatus in accordance with claim 1, said print control apparatus comprising:
an enhancement execution setting module that sets in advance execution or non-execution of enhancement for the saturation of the color image data; and
a saturation enhancement prohibition module that prohibits said saturation enhancement module from enhancing the saturation and supplies the color image data received by said image data input module to said ink application density specification module, when the setting represents non-execution of enhancement for the saturation of the color image data,
wherein said ink application density specification module specifies the application density of each color ink, based on the supplied color image data.

8. A print control apparatus in accordance with claim 1, wherein said image data with the enhanced saturation is expressed in an L*A*B* color system.

9. A print control apparatus in accordance with claim 1, wherein said color image has been recorded using an image recording device such as a scanner or a digital camera.

10. A print control apparatus in accordance with claim 1, wherein there is a linear dependency between the gradation of the saturation in said original image and the gradation of the saturation in said image with enhanced saturation.

11. A print control apparatus that controls a printing unit, which applies multiple color inks on a printing medium to print a color image, said print control apparatus comprising:
a conversion table that stores a mapping of color image data to converted image data, which is obtained through predetermined data conversion of the color image data;
an image data input module that receives an input of color image data;
an image data conversion module that refers to the conversion table and converts the input color image data into the converted image data, the converted image data being expressed in a color system that can independently handle the saturation;
a conversion module that converts the image data with the enhanced saturation into image data for printing;
an ink application density specification module that specifies an application density of ink to be applied on the printing medium with regard to each of the multiple color inks, based on the color image data that has the enhanced saturation in the predetermined range of hues and has been converted into image data for printing; and
a control signal output module that outputs the specified application density of each color ink as a control signal to said printing unit,
wherein the conversion table stores the image data with the enhanced saturation in the predetermined range of hues as the converted image data and wherein the converted image data representing the enhanced saturation maintains the gradation of saturation of the original image with regard to the predetermined range of hues.

12. A print control apparatus in accordance with claim 11, wherein the conversion table stores a mapping of color image data in a first color system to color image data in a second color system.

13. A printing apparatus that applies multiple color inks on a printing medium to print a color image, said printing apparatus comprising:
a printing unit that applies the multiple color inks on the printing medium;
an image data input module that receives an input of color image data;
a hue storage module that stores in advance a predetermined range of hues for which saturation is to be enhanced;
a saturation enhancement module that converts the input color image data into image data expressed in a color system that can independently handle the saturation and, with regard to the predetermined range of hues of the image data, enhances the saturation of the image data in such a way that the gradation of saturation of the original image data is maintained;
a conversion module that converts the image data with the enhanced saturation into image data for printing;
an ink application density specification module that specifies an application density of ink to be applied on the printing medium with regard to each of the multiple color inks, based on the color image data that has the enhanced saturation in the predetermined range of hues and has been converted into image data for printing; and
a control signal output module that outputs the specified application density of each color ink as a control signal to said printing unit.

14. A print control method of controlling a printing unit, which applies multiple color inks on a printing medium to print a color image, said print control method comprising the steps of:
storing a predetermined range of hues for which saturation is to be enhanced;
receiving an input of color image data;

converting the input color image data into image data expressed in a color system that can independently handle the saturation;

enhancing the saturation of the image data in such a way that the gradation of saturation of the original image data is maintained with regards to the predetermined range of hues;

converting the image data with the enhanced saturation into image data for printing;

specifying an application density of ink to be applied on the printing medium with regard to each of the multiple color inks, based on the color image data that has the enhanced saturation in the predetermined range of hues and has been converted into image data for printing; and outputting the specified application density of each color ink as a control signal to said printing unit.

15. A print control method in accordance with claim 14, wherein the saturation in the predetermined range of hues is enhanced after conversion of the input color image data into a data format that is capable of expressing higher saturation than saturation expressible by the input color image data.

16. A computer program product, stored on a machine-readable medium, for controlling a printing unit, which applies multiple color inks on a printing medium to print a color image, comprising instructions operable to cause a computer to:

store a predetermined range of hues for which saturation of a color image is to be enhanced;

receive an input of color image data;

convert the input color image data into image data expressed in a color system that can independently handle the saturation;

enhance the saturation of the image data in such a way that the gradation of saturation of the original image is maintained with regard to the predetermined range of hues of the image data;

convert the image data with the enhanced saturation into image data for printing;

specify an application density of ink to be applied on the printing medium with regard to each of the multiple color inks, based on the color image data that has the enhanced saturation in the predetermined range of hues and has been converted into image data for printing; and output the specified application density of each color ink as a control signal to said printing unit.

17. A computer for controlling a printing unit, which applies multiple color inks on a printing medium to print a color image, said computer being configured to:

store a predetermined range of hues for which saturation of a color image is to be enhanced;

receive an input of color image data;

convert the input color image data into image data expressed in a color system that can independently handle the saturation;

enhance the saturation of the image data in such a way that the gradation of saturation of the original image is maintained with regard to the predetermined range of hues of the image data;

convert the image data with the enhanced saturation into image data for printing;

specify an application density of ink to be applied on the printing medium with regard to each of the multiple color inks, based on the color image data that has the enhanced saturation in the predetermined range of hues and has been converted into image data for printing; and output the specified application density of each color ink as a control signal to said printing unit.

18. An image processing apparatus that receives an input of color image data, makes the input color image data subject to a predetermined series of image processing, and outputs the processed color image data to outside to print a resulting image, said image processing apparatus comprising:

an image data input module that receives the input of the color image data;

a hue storage module that stores in advance a specified hue for which saturation is to be enhanced;

a saturation enhancement module that enhances saturation of the specific hue of the color image data according to a difference between saturation expressible by the color image data and saturation printable with a color printer, which prints color images, with regard to the specific hue such that the gradation of saturation of the original image data is maintained; and an image data output module that outputs the color image data with the enhanced saturation.

* * * * *